No. 747,221. PATENTED DEC. 15, 1903.
T. B. RENNELL.
VARIABLE SPEED TRANSMISSION GEARING.
APPLICATION FILED MAR. 12, 1903.
NO MODEL. 4 SHEETS—SHEET 1.
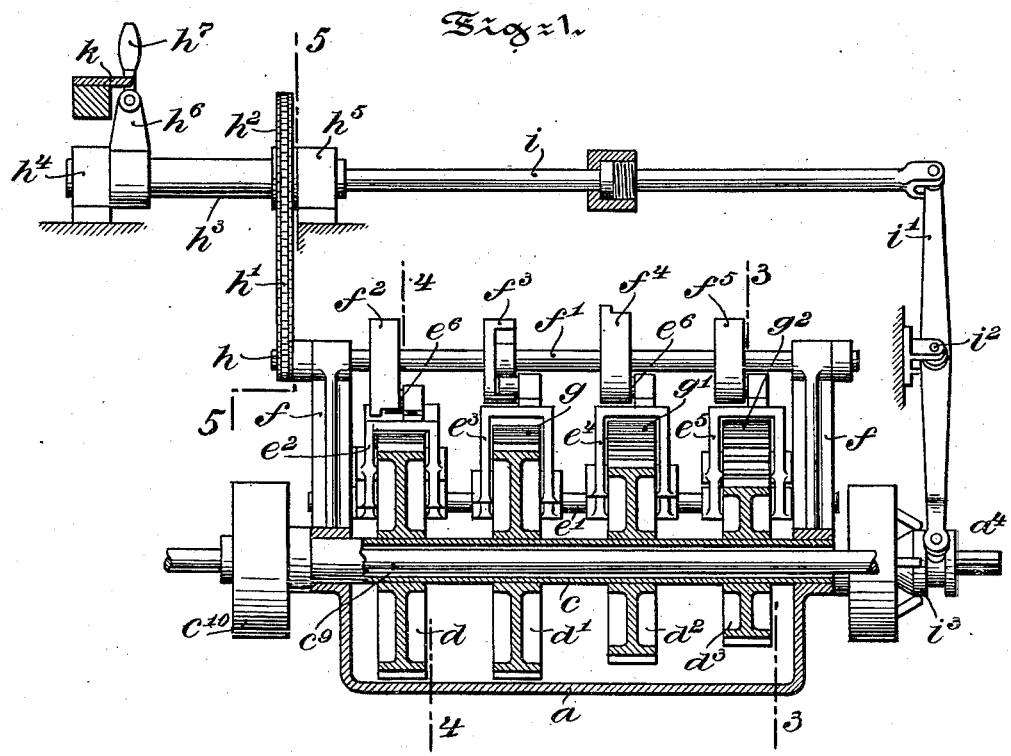
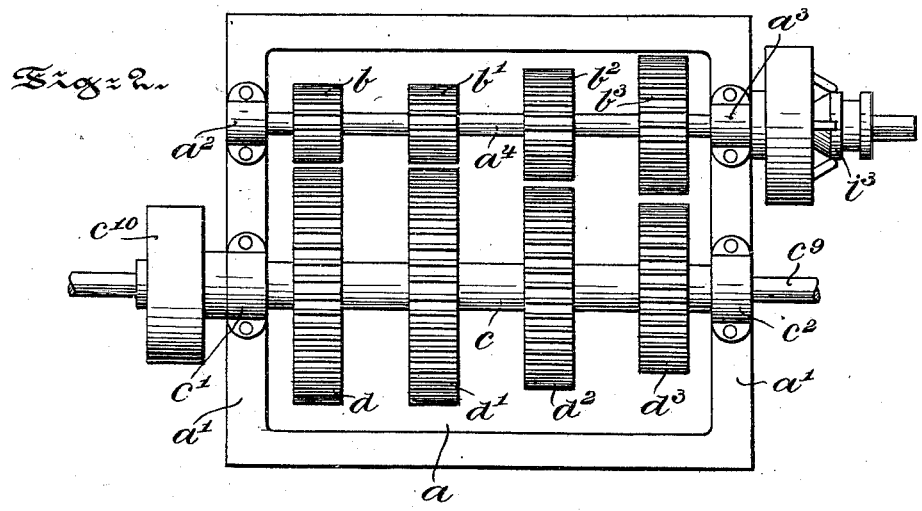
Witnesses
Jas. C. Wobensmith.
Wilhelm Vogt
Inventor
Thornton B. Rennell,
By J. Walter Douglass
Attorney

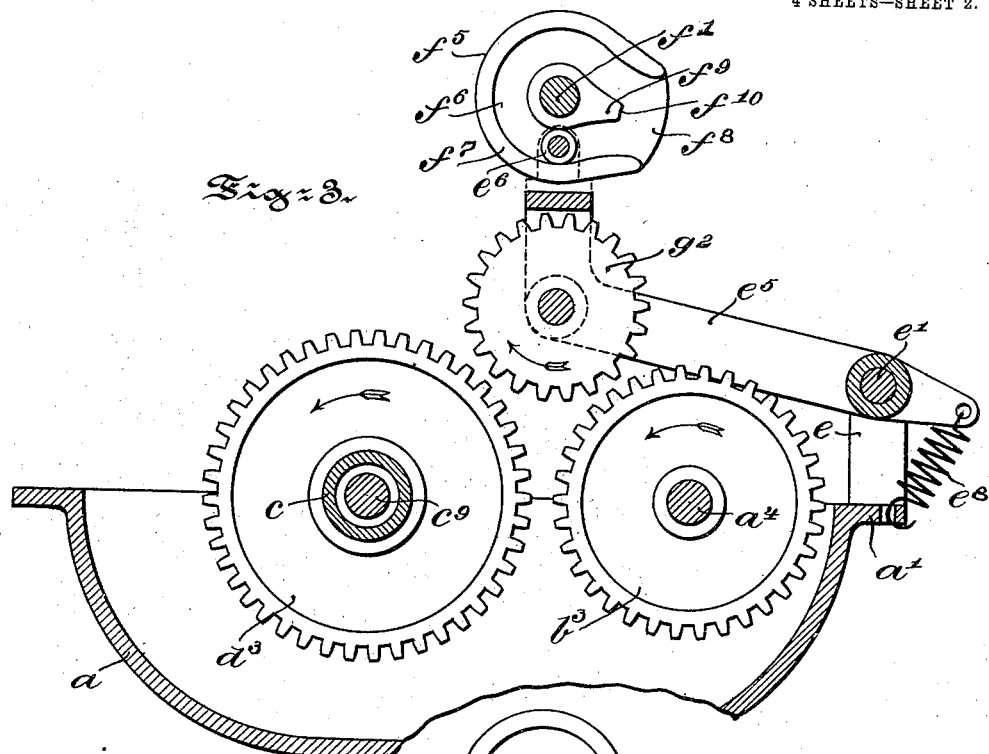
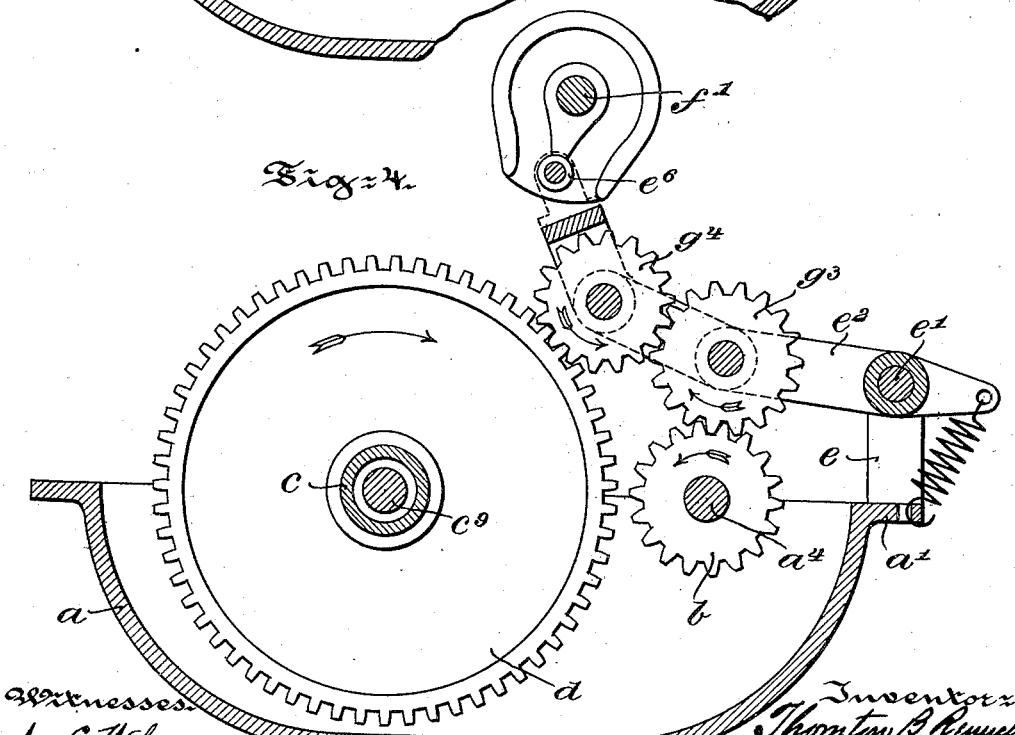

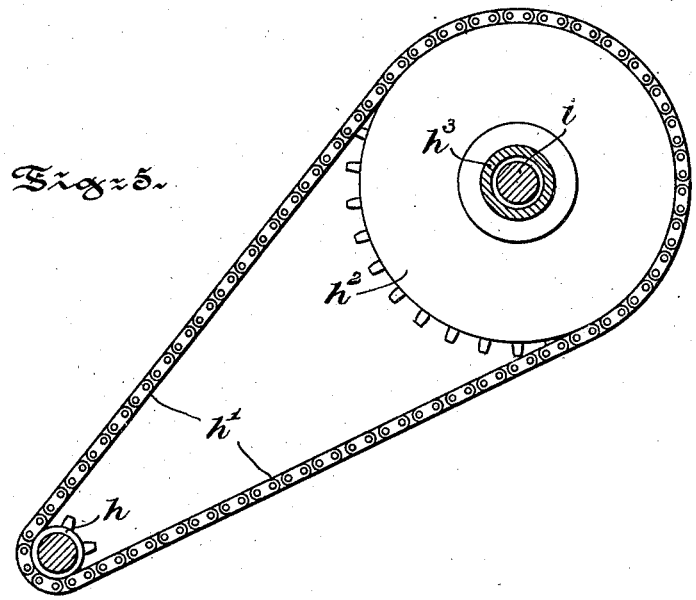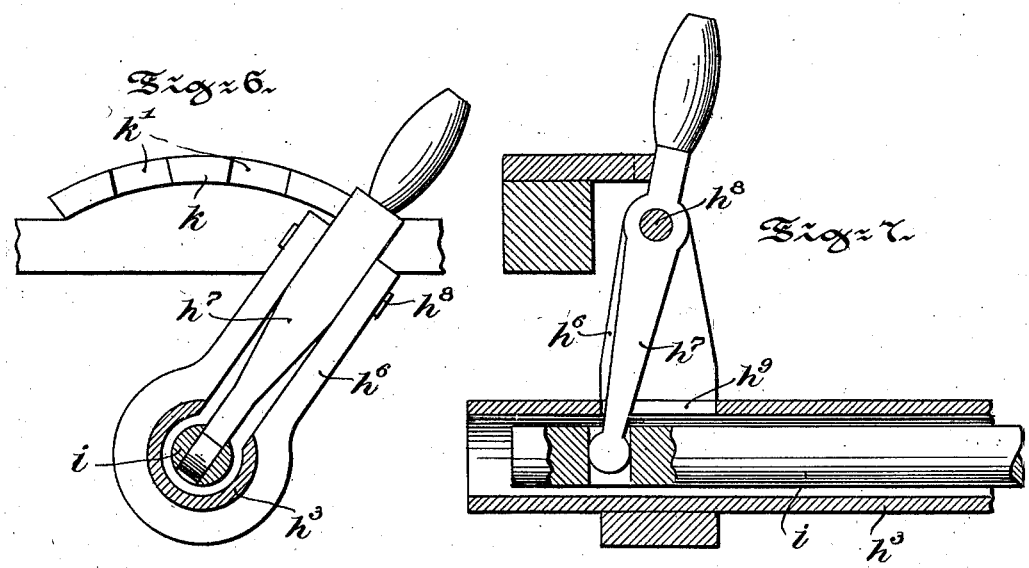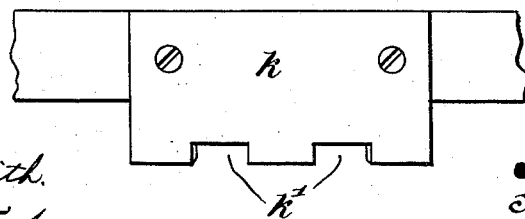

No. 747,221. PATENTED DEC. 15, 1903.
T. B. RENNELL.
VARIABLE SPEED TRANSMISSION GEARING.
APPLICATION FILED MAR. 12, 1903.
NO MODEL. 4 SHEETS—SHEET 4.
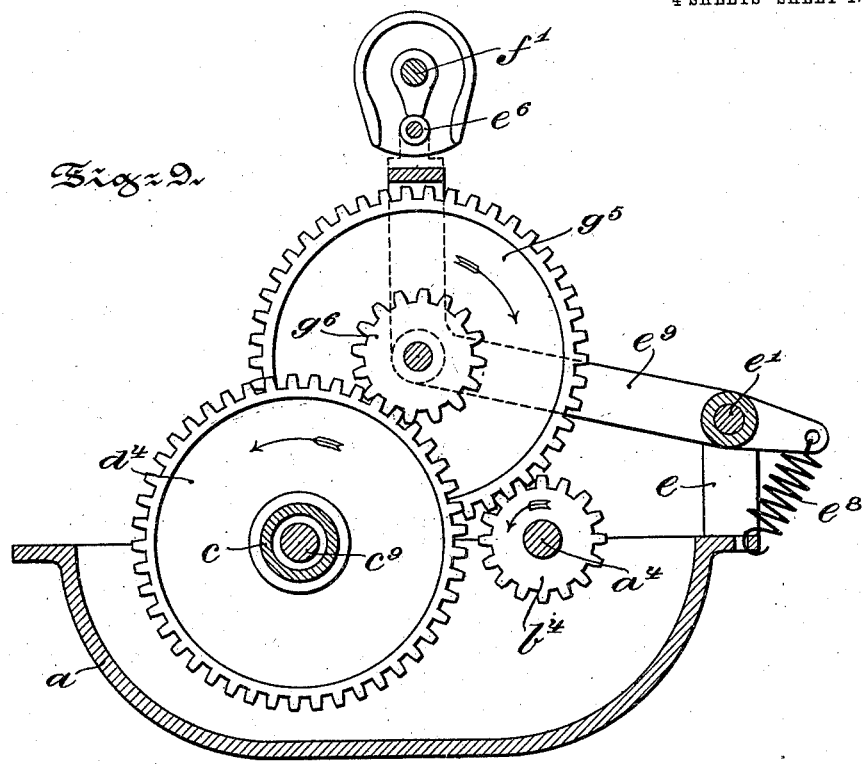
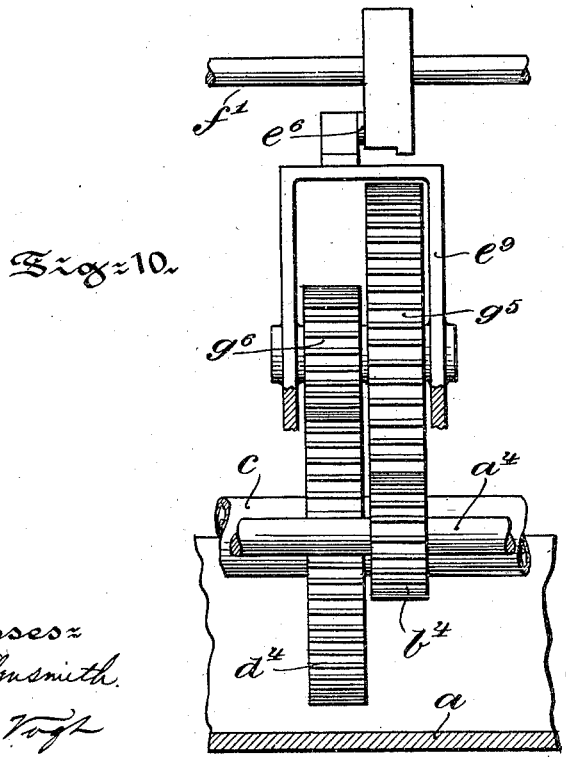
Witnesses:
Jas. C. Wobensmith.
Wilhelm Vogt.
Inventor:
Thornton B. Rennell,
By J. Walter Douglas
Attorney No. 747,221. Patented December 15, 1903.

UNITED STATES PATENT OFFICE.

THORNTON B. RENNELL, OF DENVER, COLORADO.

VARIABLE-SPEED-TRANSMISSION GEARING.

SPECIFICATION forming part of Letters Patent No. 747,221, dated December 15, 1903.

Application filed March 12, 1903. Serial No. 147,376. (No model.)

*To all whom it may concern:*

Be it known that I, THORNTON B. RENNELL, a citizen of the United States, residing at the city of Denver, in the county of Denver and State of Colorado, have invented certain new and useful Improvements in Variable-Speed-Transmission Gearing, of which the following is a specification.

My invention has relation to a variable-speed-transmission gearing adapted to drive motor-vehicles, launches, or the like with various speeds and either in a forward or backward direction and also applicable for use in connection with mechanism in which variable speed is required without change in the speed of the driving-shaft of such mechanism; and in such connection it relates to the construction and arrangement of such transmission-gearing.

The principal objects of my invention are, first, to provide a variable-speed-transmission gearing wherein none of the gears are in mesh with each other except those actually transmitting the power; second, to provide in such a gearing means whereby in changing from one speed to another to cause the entire face of the teeth of such gears to engage each other simultaneously; third, to provide in such a gearing means whereby the source of power is disconnected while changing from one speed to another, and, fourth, to provide means whereby one pair of gears is brought into operative condition before the source of power is applied to make effective in action the transmission-gearing.

The nature and scope of my invention will be more fully understood from the following description, taken in connection with the accompanying drawings, forming part hereof, in which—

Figure 1 is a view, partly in section and partly in elevation, of a variable-speed-transmission gearing embodying main features of my invention. Fig. 2 is a top or plan view of the said transmission-gearing, certain parts thereof being removed, illustrating two sets of gear-wheels of varying diameters, which by means of their respective shafts are held out of engagement with and a certain distance apart from each other. Fig. 3 is a cross-sectional view, enlarged, taken on the line 3 3 of Fig. 1, illustrating in side elevation one of the sets of gear-wheels, an idler-wheel adapted to connect the gear-wheels with each other to transmit the movement of a driving-shaft to the driven shaft and to rotate this shaft in the same direction, and also illustrating means to bring the idler gear-wheel into and out of engagement with the gear-wheels. Fig. 4 is a similar view, taken on the line 4 4 of Fig. 1, illustrating two idler gear-wheels and their operating means adapted when brought into engagement with the gear-wheels to rotate the driven shaft in a direction opposite to that of the driving-shaft. Fig. 5 is a sectional view, enlarged, taken on the line 5 5 of Fig. 1, illustrating in side elevation sprocket-wheels and a sprocket-chain, which control the means for raising and lowering the idler gear-wheels. Fig. 6 is a view, partly in section and partly in elevation, illustrating a lever-arm and its bracket, means for locking the lever-arm in different positions, and means operated by the oscillating movements of said arm. Fig. 7 is a sectional view of Fig. 6. Fig. 8 is a detail view illustrating in top or plan view the locking means for the lever-arm. Fig. 9 is a cross-sectional view illustrating in side elevation two idler gear-wheels of varying diameters arranged side by side in a supporting-bracket and in engagement with gear-wheels on the driving and driven shafts; and Fig. 10 is a view, partly in section and partly in front elevation, of the gear-wheels of Fig. 9.

Referring to the drawings, $a$ represents a housing to the rims or flanges $a'$ of which are secured brackets $a^2$ and $a^3$, adapted to support a shaft $a^4$, which is driven by any suitable source of power. (Not shown.) To the shaft $a^4$ are rigidly secured a number of gear-wheels—in the present instance, four gear-wheels $b$, $b'$, $b^2$, and $b^3$—of varying diameters. As shown in Fig. 2, parallel to the shaft $a^4$ is arranged a second shaft $c$, which is hollow, as shown, and which is supported by the brackets $c'$ and $c^2$, secured to the rim $a'$ of the housing $a$. To this shaft are rigidly secured gear-wheels $d$, $d'$, $d^2$, and $d^3$ of varying diameters and occupying positions directly opposite the gear-wheels $b$, $b'$, $b^2$, and $b^3$ on the shaft $a^4$. To the rim $a'$ of the housing $a$ are secured brackets $e$, supporting a shaft $e'$, and standards $f$, supporting a shaft $f'$. As shown in Figs. 1 and 3, the shaft $e'$ is provided with brackets $e^2$, $e^3$, $e^4$, and $e^5$, which at their free ends carry rollers $e^6$, engaging cams $f^2$, $f^3$, $f^4$, and $f^5$, secured to the shaft $f'$. Each of the brackets $e^3$, $e^4$, and $e^5$ is provided with an idler gear-wheel $g$, $g'$, or $g^2$. The bracket $e^2$, however, carries two idler gear-wheels $g^3$ and $g^4$, as shown in Fig. 4, for a purpose to be presently described. Each of the cams $f^2$, $f^3$, $f^4$, and $f^5$ consists of a disk $f^6$, provided with a flange $f^7$, an open portion $f^8$ in said flange $f^7$, and a cam portion $f^9$, with a curved end $f^{10}$, and their arrangement on the shaft $f^2$, with their cam portion $f^9$ and opening $f^8$ in the flange $f^7$, is at an angle of ninety degrees to each other. The opening $f^8$ permits the cam $f^9$ to depress the roller $e^6$ and to hold its bracket and idler in an operative position, as shown in Fig. 4, while the flange $f^7$, in conjunction with a spring $e^8$, is adapted to support a bracket and its idler in an inoperative position, as shown in Fig. 3.

As shown in Figs. 1 and 5, to the end of the shaft $f^2$ is secured a sprocket-gear $h$, which by means of a sprocket-chain $h'$ is connected with a sprocket-gear $h^2$, carried by a hollow shaft $h^3$, supported in brackets $h^4$ and $h^5$. To the hollow shaft $h^3$ is rigidly secured a bracket $h^6$, provided with a lever-arm $h^7$, which at the point $h^8$ is pivotally secured to the bracket $h^6$. The lower end of the lever-arm $h^7$ passes through a slot $h^9$, arranged in the hollow shaft $h^3$, and engages a rod $i$, loosely mounted in the shaft $h^3$, and the upper end of the lever-arm engages a quadrant $k$, provided with notches $k'$, and is held in position by the same. In the instance of an automobile the lever-arm $h^7$, bracket $h^6$, and quadrant $k$ are located adjacent to the seat of an operator, so as to be at all times in easy reach. The rod $i$, engaged by the lever-arm $h^7$, is connected at its free end with a lever $i'$, having its fulcral point in the bracket $i^2$, which engages a clutch $i^3$, connected with the driven shaft $a^4$, as shown in Figs. 1 and 2.

The quadrant $k$, sprocket-gear $h^2$, and sprocket-gear $h$ are so proportioned that when the lever-arm $h^7$ is moved over the entire quadrant the sprocket-gear $h$ and shaft $f^2$ by means of the sprocket-gear $h^2$ describe a complete revolution. The quadrant $k$ is furthermore so arranged that the distance of one notch from another, in conjunction with the ends of the quadrant $k$, is equal to a quarter-revolution of the shaft $f^2$. Since the cams $f^2$, $f^3$, $f^4$, and $f^5$, with their openings $f^8$ in the flange $f^7$, are arranged at an angle of ninety degrees to each other, it follows that only one of the brackets $e^2$, $e^3$, $e^4$, or $e^5$—for instance, the bracket $e^5$—by means of the cam portion $f^9$ will be depressed against the tension of a spring $e^8$ and bring its idler-gear $g^2$ into engagement with the gear-wheels $b^3$ and $d^4$, arranged opposite each other, while at the same time the brackets $e^3$, $e^4$, and $e^5$, and their idlers will be held by their respective cams $f^2$, $f^3$, and $f^4$ out of engagement with the gear-wheels on the driving-shaft $a^4$ and driven shaft $c$. Instead of using cams, as shown, for actuating the idler-wheels eccentrics may be substituted therefor with good results. As soon as the idler-wheel $g^2$ is brought into engagement with the gear-wheels $b^3$ and $d^3$ the entire face of the teeth thereof will be brought into engagement with each other and for this reason will not be liable to be broken when the gearing is under a heavy load or strain. The idler-gear $g^2$ by engaging the gear-wheels $b^3$ and $d^3$ couples the same to each other and permits of the transmitting of the rotary movement of the driving-shaft $a^4$ to the driven shaft $c$, thereby rotating the latter in the same direction as the driving-shaft. From the different diameters of the gear-wheels arranged on the shafts $a^4$ and $c$ it will readily be observed that the speed of rotation of the driving-shaft $a^4$ in its transmission of power to the driven shaft $c$ will be increased or decreased proportionally to the varying diameters of the respective gear-wheels arranged opposite each other on the shafts $a^4$ and $c$. Each of the idlers is held in an operative position in engagement with gear-wheels arranged in the path of its reciprocatory movements by the curved portion $f^{10}$ of the cam-surface $f^9$ engaging the roller $e^6$ of the bracket, as shown in Fig. 4. In instances, however, where the direction of rotation of the driven shaft $c$ must be reversed to that of the driving-shaft $a^4$ in order to permit an automobile or other vehicle to move backward the bracket $e^2$ is provided with two gear-wheels $g^3$ and $g^4$, meshing with each other, which when brought into engagement with the gear-wheels $b$ and $d$, as shown in Fig. 4, will rotate the gear-wheel $d$ and its shaft $c$ in a direction opposite to that of the gear-wheel $b$ and its shaft $a^4$. From the driven shaft $c$ the power may be transmitted in any desired manner to the driving mechanism of a vehicle (not shown) and the same propelled either in a forward or backward direction. In conjunction with a vehicle the hollow shaft $c$ is preferably provided with a differential gearing of any well-known type, which is arranged in a housing $c^{10}$, and is further provided with a shaft $c^9$, arranged within the driven shaft $c$. To prevent, however, the driving-shaft $a^4$ being rotated before an idler-wheel engages the gear-wheels, secured to the driving-shaft $a^4$ and driven shaft $c$ and arranged in the path of movement thereof, the lever-arm $h^7$ uncouples the driving-shaft $a^4$ by bringing the coupling $i^3$ out of engagement therewith. This uncoupling of the driving-shaft $a^4$ is accomplished by the necessary movement of the lever-arm $h^7$ toward the hollow shaft $h^3$ in order to bring the same out of engagement with the quadrant $k$. The lever-arm $h^7$ by being so moved on its fulcral point in the bracket $h^6$ shifts with its lower end the rod $i$, toward the left in Fig. 1, into the position shown in Fig. 7. This movement, imparted to the rod $i$ by means of the lever $i^2$, is transmitted to the coupling $i^3$, which uncouples the driving-shaft $a^4$. The lever-arm $h^7$ so released from the quadrant $k$ is now shifted to the right or left in Fig. 6, and this movement by means of the bracket $h$ is transmitted to the hollow shaft $h^3$. This shaft $h^3$ by means of the sprocket gears $h^2$ and $h$ and sprocket-chain $h'$ rotates the cam-shaft $f^2$ and brings one of the idler-wheels into an operative position. The lever-arm $h^7$, brought opposite a certain notch $k'$ in the quadrant $k$ or opposite either end of the same, is now shifted back into engagement with the quadrant $k$, as shown in Fig. 1. This movement shifts the rod $i$ toward the right in Fig. 1 and couples the driving-shaft $a^4$ with the coupling $i^3$.

From the foregoing description it will readily be observed that each position of the lever-arm $h^7$ in the quadrant $k$ represents a certain speed with which the vehicle will be propelled either forward or backward. In the present instance three different forward degrees of speed and one backward degree of speed can be obtained with speed-transmission gearing, as shown and described. It is, however, obvious that other different degrees of speed either backward or forward may readily be obtained by simply increasing the number of complemental gear-wheels on the driving and driven shafts and idler-gears for meshing therewith or by arranging two idler gear-wheels $g^5$ and $g^6$ of varying diameters side by side in a bracket $e^9$, as shown in Figs. 9 and 10. In this instance the gear-wheel $b^4$, secured to the driving-shaft $a^4$ of a small diameter, meshes with the idler gear-wheel $g^5$ of a larger diameter, which transmits its movement received from the gear-wheel $b^4$ to the idler gear-wheel $g^6$ of a small diameter. This idler gear-wheel $g^6$ meshes with a gear-wheel $d^4$, secured to the driven shaft $c$. From the arrangement of the gear-wheels $b^4$ and $d^4$ and the idler gear-wheels $g^5$ and $g^6$ it will readily be seen that a considerable reduction in speed and a proportional increase in power will be obtained by transmitting the power from the driving-shaft $a^4$ to the driven shaft $c$. If, however, the arrangement of gear-wheels is reversed and the gear-wheel of larger diameter be placed on the driving-shaft $a^4$ and a gear-wheel of a smaller diameter placed on the driven shaft $c$, the speed will be proportionally increased. It is also obvious that other modifications may be made in the arrangement and construction of parts without departing from the spirit or essence of my said invention.

Having thus described the nature and objects of my invention, what I claim as new, and desire to secure by Letters Patent, is—

1. In a variable-speed-transmission gearing, a driving-shaft, gear-wheels of varying diameters secured thereto, a driven shaft, gear-wheels of varying diameters secured thereto and arranged complementally to the gear-wheels of said driving-shaft, idler-gears arranged above each pair of complemental gears, a shaft adapted to support a series of brackets, said brackets supporting the idler-gears and means adapted to actuate one of said brackets at a time.

2. In a variable-speed-transmission gearing, a driving-shaft, gear-wheels of varying diameters secured thereto, a driven shaft, gear-wheels of varying diameters secured thereto and arranged complementally to the gear-wheels of said driving-shaft, idler-gears arranged above each pair of complemental gears, brackets adapted to support said idler-gears, a shaft adapted to support said brackets, cams adapted to actuate said brackets and idler-gears and to assist in supporting the same in an inoperative position, a shaft adapted to support said cams, and means adapted to actuate said cam-supporting shaft.

3. In a variable-speed-transmission gearing, a driving-shaft, gear-wheels of varying diameters secured thereto, a driven shaft, gear-wheels of varying diameters secured thereto and arranged complementally to the gear-wheels of said driving-shaft, idler-gears arranged above each pair of complemental gears, brackets adapted to support one or more of the idler-gears for each pair of complemental gears, a shaft adapted to support said brackets, a second shaft, cams arranged at varying angles to each other on said second shaft, a third shaft arranged parallel to said cam-shaft and adapted to be manually operated, and means adapted to connect said cam-shaft with said manually-operated shaft.

4. In a variable-speed-transmission gearing, a driving-shaft, gear-wheels of varying diameters secured thereto, a driven shaft, gears of varying diameters secured thereto and complemental to the gears of the driving-shaft, a clutch adapted to connect and disconnect said driving-shaft with a source of power, idler-gears arranged above each complemental pair of gear-wheels, brackets adapted to support said idlers, a shaft adapted to support said brackets, cams adapted to actuate said brackets and idler-gears and to assist in supporting the same in an inoperative position, means adapted to rotate said cams, means adapted to control the rotating means of said cams, means adapted to connect the clutch mechanism with said controlling means, said controlling means arranged to first disconnect said driving-shaft from the source of power, then to lower one of said brackets to connect complemental gears with each other, and then to again connect said driving-shaft with the source of power.

5. In a variable-speed-transmission gearing, a driving-shaft, gear-wheels of varying diameters secured to said shaft, a driven shaft, gear-wheels of varying diameters secured to said driven shaft and arranged complementally to the gear-wheels of the driving-shaft, idler-gears, brackets adapted to support said idler-gears above each pair of complemental gears, a shaft adapted to support said brackets, cams adapted to actuate said brackets, a second shaft adapted to support said cams at varying angles to each other, a third shaft, sprocket-wheels and a sprocket-chain adapted to connect said second shaft with said third shaft, a bracket secured to the third shaft, a lever-arm adapted to rotate said third shaft, means adapted to lock said lever-arm in a predetermined position, a clutch arranged on said driving-shaft, means connecting said clutch with said lever-arm, said lever-arm adapted when connected to and disconnected from the locking means to actuate said clutch mechanism and connect and disconnect the same to and from the driving-shaft and source of power.

6. In a variable-speed-transmission gearing, a hollow shaft having a bracket, a lever-arm adapted to oscillate in said bracket in a plane parallel to said shaft and to oscillate with said bracket and shaft in a plane at right angles to said shaft, means adapted to hold said lever-arm and hollow shaft in certain predetermined positions, a driving-shaft, a clutch arranged on said shaft adapted to connect and disconnect the same with a source of power, means adapted to connect said clutch with said lever-arm, gear-wheels of varying diameters secured to said driving-shaft, a driven shaft arranged parallel to said driving-shaft, gear-wheels of varying diameters secured to said driven shaft, and arranged complementally to the gear-wheels of the driving-shaft, idler-gears, brackets adapted to support said idler-gears, a shaft, cams arranged on said shaft and adapted to actuate said brackets, one at a time, means adapted to connect said cam-shaft with said hollow shaft and with said lever-arm, said lever-arm adapted when oscillated in a plane parallel to said hollow shaft to actuate said clutch and to disconnect and connect the source of power with said driving-shaft and when oscillated in a plane at right angles to said shaft to actuate the cams and to connect a pair of complemental gear-wheels with each other and to hold the remaining idler-wheels out of engagement with their respective complemental gear-wheels of the driven and driving shafts.

In testimony whereof I have hereunto set my signature in the presence of two subscribing witnesses.

THORNTON B. RENNELL.

Witnesses:
T. B. STEARNS,
DAVID BLACK.